United States Patent [19]

Ett et al.

[11] 3,842,402

[45] Oct. 15, 1974

[54] BAYESIAN ONLINE NUMERIC DISCRIMINATOR

[75] Inventors: Allen Harold Ett, Bethesda; Walter Steven Rosenbaum, Silver Spring, both of Md.

[73] Assignee: International Business Machines Corporation, Armonk, N.Y.

[22] Filed: Oct. 25, 1973

[21] Appl. No.: 409,526

[52] U.S. Cl. .......... 340/146.3 S

[51] Int. Cl. .......... G06k 9/00

[58] Field of Search .......... 340/146.3 S, 146.3 WD, 340/172.5

[56] References Cited

UNITED STATES PATENTS

| | | | |
|---|---|---|---|
| 3,233,219 | 1/1966 | Atrubin et al. | 340/146.3 S |
| 3,634,822 | 1/1972 | Chow | 340/146.3 S |

*Primary Examiner*—Gareth D. Shaw
*Assistant Examiner*—Joseph M. Thesz, Jr.
*Attorney, Agent, or Firm*—John E. Hoel

[57] ABSTRACT

An online numeric discriminator is disclosed which performs the decision making process between strings of characters coming from a dual output optical character recognition system for use in text processing or mail processing applications. The dual output OCR uses separate recognition processes for alphabetic and numeric characters and attempts to recognize each character independently as both an alphabetic and a numeric character. The alphabetic interpretation of the scanned word is outputted as an alphabetic subfield on a first output line and the numeric interpretation of the scanned word is outputted as a numeric subfield on a second output line from the OCR. The bayesian online numeric discriminator then analyzes the two character streams by calculating a first conditional probability that the OCR perceived the alphabetic subfield given that a numeric subfield was actually scanned and a second conditional probability that the OCR perceived the numeric subfield given that an alphabetic subfield was actually scanned. These first and second conditional probabilities are then compared. If the conditional probability that the OCR read the alphabetic subfield given that the numeric subfield was actually scanned, is larger than the conditional probability that the OCR read the numeric subfield given that the alphabetic subfield was actually scanned, then the numeric subfield is selected by the discriminator as the most probable interpretation of the word scanned by the OCR.

2 Claims, 9 Drawing Figures

0 O (ZERO - OH)
I - I (ONE-I, SANS SERIF)

5 - S
2 - Z

6 - G
8 - B
9 - g

4 - H
4 - A
7 Y
8 - S
8 - e

7 - T
o - n
o - c
o - U

EXAMPLE OF ALPHA/NUMERIC DISCRIMINATION USING BOND CALCULATION IN A MAIL PROCESSING APPLICATION.

GENERAL BLOCK DIAGRAM OF BOND SYSTEM

BAYESIAN ONLINE NUMERIC DISCRIMINATOR

FIELD OF THE INVENTION

The invention disclosed herein relates to data processing systems for the analysis of character streams outputted from an optical character reader.

BACKGROUND OF THE INVENTION

Historically, the alphabetic symbols employed in the English language evolved from the written representation of speech sounds developed by the Romans whereas the numerals employed in the English and other Western languages were developed by the Arabians for the written representation of numbers. With a few exceptions, the alphabet and the numerals employed in the English language were developed quite independently. This has led to the use of identical or very similar character shapes for alphabetic and numerical representation. Where the user is a human being, judgment can be employed in analyzing the context within which the character appears, reducing the likelihood that the meaning of the writer will be confused. However, with the development of optical character recognition machines, that is, devices for reading data from printed, typed, or hand printed documents directly into a computer, the confusing similarity between alphabetic characters and numerical characters becomes critical.

There is shown in FIG. 1 several different categories of numeric-alphabetic character problem pairs. The lines between categories are not sharply drawn. Confusions such as are illustrated do not always occur but they do occur frequently enough to seriously impede the reduction of printed or typed text to a data base. FIG. 1A shows the primary confusions are the numeral zero to the letter "oh" and the numeral one to the letter I (sans serif). These characters are usually indistinguishable in a multifont environment. FIG. 1B shows character pairs such as the numeral five and the letter S and the numeral two and the letter Z which are topologically similar and are only distinguished by the sharpness of corners. This sharpness is one of the first attributes to disappear as print quality degrades. FIG. 1C illustrates character pairs such as the numeral six and the letter G, the numeral eight and the letter B, and the numeral nine and the letter G which differ in only very minor topological features which tend to disappear under moderate conditions of print quality degradation. FIG. 1D illustrates character pairs such as the numeral four (open top) and the letter H, the numeral four (closed top) and the letter A, the numeral seven and the letter Y, the numeral eight and the letter S, and the numeral eight and the letter E which differ somewhat more than in FIG. 1C above, but which still become confused with the degree of degradation commonly present in type written text. FIG. 1E illustrates character pairs such as the numeral seven and the letter T, the numeral zero and the letter N, the numeral zero and the letter C, and the numeral zero and the letter U which differ by parts which are often lost because of a cocked typeface or because of a failure of the character segmentation circuitry in the OCR to operate perfectly in the separation of touching characters.

The key to reliable text processing is the ability to readily and reliably delineate numeric subfields from alphabetic subfields at the earliest phases of preanalysis of the output from the opptical character reader. Although seemingly a trivial affair, in reality reliable discrimination of numeric subfields in an omni-font character recognition environment is a very complex process, stemming from the fact that the Roman and Arabic character sets, to which the alphabetical and numerical characters respectively relate, were generated independently with no attempt to avoid mutual confusion. Common fonts share many of the same basic geometric shapes. The alphabetic-numeric character discrimination problem on the character recognition level, reflects itself on the subfield level during post processing. Many common alphabetical words can be recognized in part or in whole as numeric subfields. Some common misinterpretations are "South" into 80478 or 804th. "Third" into 781rd, and "Fifth" into 01078 or 010th. The converse of the situation also holds for many numeric subfields.

The crux of the postprocessing problem in numeric subfield discrimination is that real or aliased numeric character strings do not lend themselves to methods of direct contextual analysis. A numeric subfield is completely nonredundant; any set of digits creates a meaningful data set.

In existing optical character recognition systems, the final alphabetic-numeric discrimination of each subfield is determined by the process of elimination. This requires that the alphabetic recognition stream corresponding to each subfield not already recognized as a key word, be processed for match against a stored directory of permissible received messages known in advance. Any subfields not matched are designated numeric. However, in mail processing applications in a national encoding environment or in general test processing, this approach is clearly unfeasible since the directory of permissible received messages is excessively large and the time required for the multiple access of that directory becomes prohibitive. In addition, the above approach would tend to label garbled alphabetic subfields as numeric.

OBJECTS OF THE INVENTION

It is an object of the invention to process textual date outputted from an optical character reader in an improved manner.

It is a further object of the invention to discriminate between alphabetic and numeric character subfields scanned by an optical character reader without the need for a stored directory of permissible received messages known in advance.

It is a further object of the invention to distinguish between alphabetical and numerical subfields outputted from an optical character reader in a shorter period of time than that achieved in the prior art.

SUMMARY OF THE INVENTION

The bayesian online numeric discriminator performs the alphabetic-numeric decision making process between two strings of characters coming from a dual output optical character recognition system. It comprises an optical character recognition machine adapted to scan the characters in a character field, output on a first OCR output line the alphabetic character which most nearly matches each character scanned as an alphabetic field for all characters scanned, and output on a second OCR output line a numeric character which most nearly matches each character scanned as a numeric field for all characters scanned. A first storage address register is connected to the first OCR output line for sequentially storing each alphabetic character in the alphabetic field outputted on the first OCR output line. A second storage address register is connected to the second OCR output line for sequentially storing each numeric character in the numeric field outputted on the second OCR output line. A storage means is connected to the first and second storage address registers, having stored therein a first type of conditional probability that a certain alphabetic character was inferred by the OCR given that a certain numeric character was scanned, for all combinations of alphabetic characters with numeric characters. The storage means is accessed by the contents of the first and second storage address registers to yield the first type conditional probability that the numeric character stored in the second storage address register was misread by the OCR as the alphabetic character stored in the first storage address register. The storage means also has stored therein, a second type of conditional probability that a certain numeric character was inferred by the OCR given that a certain alphabetic character was scanned, for all combinations of alphabetic characters with numeric characters. The storage means is accessed by the contents of the first and second storage address registers to yield the second type conditional probability that the alphabetic character stored in the first storage address register was misread by the OCR as the numeric character stored in the second storage address register means, for calculating a first product of all the first type conditional probabilities accessed from the storage means. This first product is a first total conditional probability that all numeric characters outputted on the second OCR output line were misread by the OCR as the alphabetic characters outputted on the first OCR output line. The multiplier means also calculates a second product of all the second type conditional probabilities accessed from the storage means. The second product is a second total conditional probability that all the alphabetic characters outputted on the first OCR output line were misread by the OCR as the numeric characters outputted on the second OCR output line. A comparator is connected to the multiplier means for comparing the magnitudes of the first and second total conditional probabilities and outputting an indication that the scanned character field is alphabetic if the second total conditional probability is greater than the first total conditional probability or, that the scanned character field is numeric if the first total conditional probability is greater than the second total conditional probability.

The bayesian online numeric discriminator is thus capable of discriminating between alphabetic and numeric character subfields scanned by an optical character reader without the need for a stored directory of permissible received messages known in advance. Without the necessity of a directory, the alphabetic-numeric distinction can be made in a shorter period of time than that achieved in the prior art.

DESCRIPTION OF THE DRAWINGS

The foregoing and other objects, features, and advantages of the invention will be apparent from the following more particular description of the preferred embodiments of the invention, as illustrated in the accompanying drawings.

DISCUSSION OF THE PREFERRED EMBODIMENT

THEORY OF OPERATION FOR THE BAYESIAN ONLINE NUMERIC DISCRIMINATOR

Figures 1A, 1B, 1C, 1D, 1E, 2:
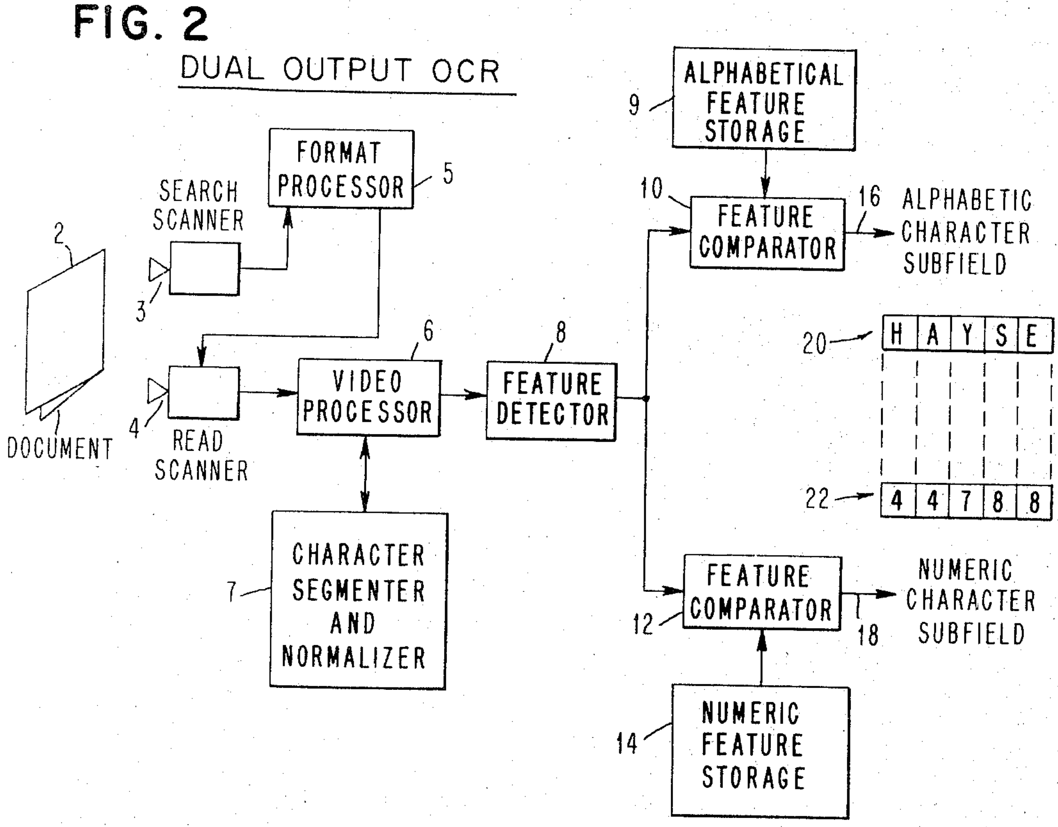
FIG. 1A-1E depicts some numeric-alphabetic character problem pairs.
FIG. 2 depicts a block diagram of a dual output optical character reader.

The BOND procedure seeks to achieve the alpha numeric inference capability by associating with a numeric subfield a certain form of quasi-redundancy. Redundancy in a contextual sense means dependencies exist between the presence of one character and another. Normally contextual redundancy is considered in a horizontal sense—that is to say, between characters on a line, within a word. An example of this concept is diagram statistics. These probabilities of character juxtaposition combinations allow the projection of likely succeeding characters from knowledge of the preceding one. Hence if given the alpha string SPRI-G;N would be chosen over, lets say Z to fill the blank position. Mathematically, this takes the form of the conditional probability statement.

$$P_d(a_k/a_i) \quad (1)$$

where $a_i$ is observed and $a_k$ is projected as a possible following character. The value of equation 1 relates to the compatibility of the $a_ia_k$ character pair with respect to English text.

Clearly no analog to contextual redundance in the form of diagrams exists with respect to numeric subfields.

Although redundancy of the horizontal form does not exist for numeric subfields, redundancy of a special "vertical" nature; for example:

| | | |
|---|---|---|
| Alpha channel | SIOUX FALLS SD<br>S*LOL | |
| | | vertical redundancy |
| Numeric channel | 5100* 56**5 50 57101 | |

can be induced by virtue of the dual output OCR recognition environment, which for each character scanned creates independent outputs of attempted alpha and numeric recognitions. Characteristics of this type of dual recognition system are:

a. Each legitimate numeric character is misrecognized by the alpha recognition channel as a specific set of alphas. (For example, 2 is often read in the alpha channel as Z).

b. Each legitimate alpha character is respectively misrecognized by the numeric recognition channel as a reject or one of a specific set of numerics. (For example, S is often read in the numeric channel as 5).

A concept of vertical redundancy is developed here which associates the recognition of a character in one channel with one of a set of misrecognitions possible in the other channel. This can be formulated as the conditional probabilities:

$$P(a_j/n_i) \tag{2}$$

given numeric character $n_i$ has been scanned; the probability that the alpha recognition misrecognized it as "$a_j$." The converse conditional probability statement:

$$P(n_j/a_i) \tag{3}$$

relates the probability that given the alpha character "$a_i$" has been scanned; that the numeric recognition misrecognized it as "$n_j$."

Equations 2 and 3 are referred to as Channel Confusion Probabilities and are denoted formally as:

$$P_{cc}(a_j/n_i) \tag{4}$$

$$P_{cc}(n_i/a_j) \tag{5}$$

An analysis of OCR machine performance data readily yields complete sets of channel confusion probabilities as they relate to numerics Table I and alphas Table II. The inference potential of these statistics is enhanced by compiling them independently with respect to upper and lower case alpha characters and the various conflict and reject characters. (INSERTS I and II)

Using an OCR machine performance data base, one can proceed to implement the BOND procedure. The subfields delt with are those whose dual channel recognition output was indeterminant with respect to a reject symbol criterion. The reject symbol criterion is that the alpha and numeric subfields differ by two or more reject symbols; that subfield with fewer reject symbols is chosen as having been scanned. The BOND seeks to discriminate the alpha and the numeric subfields on the basis of their "Bayesian Likelihood" factors. This implies that we assess the output of both the alphabetic and the numeric channels from the perspective:

$$P(\text{alpha read/numeric scanned}) \tag{6}$$

and $$P(\text{numeric read/alpha scanned}). \tag{7}$$

Equation 6 is the probabilistic statement which assesses the compatibility of the alpha channel recognition output with the assumption that a numeric subfield has been scanned. Equation 7 evaluates the converse; that is, the compatibility of the numeric channel recognition output with the assumption that an alpha subfield has been scanned. Equations 6 and 7 for computational purposes, can be expressed in terms of products of Channel Confusion Probabilities. Hence:

$$P(\text{alpha read} \mid \text{numeric scanned}) = \prod_{n=1}^{k} P_{cc}(a_n \mid n_n) \tag{6a}$$

$$P(\text{numeric read} \mid \text{alpha scanned}) = \prod_{n=1}^{k} P_{cc}(n_n \mid a_n) \tag{7a}$$

where "k" is the number of characters in the subfield. In this perspective, a subfield's alpha or numeric genre stands out as the quotient of the ratio of equation 6a to equation 7a. That is:

$$\phi = \frac{\prod_{n=1}^{K} P_{cc}(a_n \mid n_n)}{\prod_{n=1}^{K} P_{cc}(n_n \mid a_n)} \tag{8}$$

where $\phi$ 1 implies alpha, $\phi$ 1 implies numeric.

The inference inherent in the formulation of equation 8 results from the ratio of Bayesian Likelihood factors. This assumes that no significant a priori statistical data is available.

With respect to a search for ZIP code in mail processing applications, the restrictions on latitude of search make this assumption of no a priori data basically sound. In the context of the house number field, however, meaningful a priori statistics can be compiled to reflect the probability of a numeric subfield being present in a given position within an address line of a predetermined length. Such statistics have been compiled using several hundred thousand Large Volume Mailer letter addresses recorded on tape. Table III displays these statistics. The respective alpha subfield a priori probability follows directly as the complement of the corresponding numeric subfield a priori probability. Hence the BOND formulation used in analyzing the house number field in mail processing applications has the form:

$$\phi = \frac{\prod_{n=1}^{k} P_{cc}(a_n \mid n_n) P_N\,(\text{numeric present})}{\prod_{n=1}^{k} P_{cc}(n_n \mid a_n) P_A\,(\text{alpha present})}$$

or $$\phi = \frac{\prod_{n=1}^{k} P_{cc}(a_n \mid n_n) P_N\,(\text{numeric present})}{\prod_{m=1}^{k} P_{cc}(n_n \mid a_n)[1 - P_N\,(\text{numeric present})]} \tag{9}$$

where:

$\phi \leq 1$ implies alpha $\phi > 1$ implies numeric. (INSERT III)

The concerted use of the Bayesian online numeric discriminant procedures have proved in test bed simulations of mail processing applications, to be highly effective. Using raw MPI input, a correct alphanumeric discrimination rate of 99 percent has been achieved. It should be noted at this point, that the analysis performed in equations 8 and 9 may also be achieved by means of an additive sum of the logs of the respective probability factors.

Figure 4:
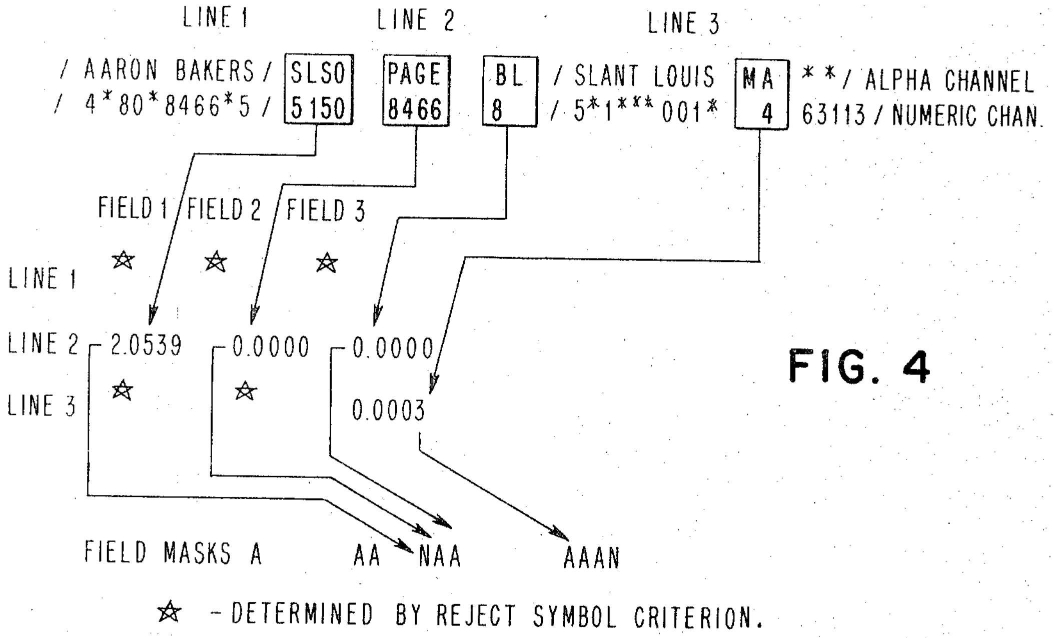
FIG. 4 is an example of alphanumeric discrimination using the bayesian online numeric discriminator.

FIG. 4 is a copy of the BOND output of an actual MPI read. The step by step calculations relating to the first two BOND quotients is shown in Table IV.

Another benefit of the basic technique implemented above is the capability to correctly discern the presence of mixed alpha/numeric house numbers such as 1220A Blair Mill Road. The likely form of the alpha read of the numeric subfield would be 'iZZoA' while the numeric read would be '12204.' The channel confusion statistics show the scan of a 4 as being incompatible with the alpha channel confusion generated of an "A." If noted as a valid exception case, the trailing "A" could be flagged just as th, rd, etc., are and the remaining numeric digits processed by the system.

The Bayesian Online Numeric Discriminator Apparatus

The dual output optical character reader 100 used in the Bayesian online numeric discriminator, is shown in FIG. 2. In general text processing, the printed matter on the document 2 undergoes a search scan function performed by the search scanner 3 which consists of the prescan and format processing function. The prescan consists of collecting digital outputs from the optical scan photo-FFT arrays in the search scanner 3 and transferring them to the format processor 5. The format processor takes the digital outputs and performs the line find and, in mail processing operations, the adress-find functions. The line find function determines the horizontal and vertical coordinates of all potential text lines and generates the geometric coordinates necessary for the processor to calculate the location and skew of the text. In mail processing applications, the address find junction determines the best address block on the mail piece and supplies the horizontal and vertical start positions and skew data for the read scan section. In the read scanner 4, there are four 64-cell optical scan photo-FET arrays. They are imaged independently with the image consisting of 64 cells, 4 mils wide on 4 mil centers. Each 64-cell array will read one text line. The output from the four 64-cell arrays are digitized and sent to the video processor 6 for every 0.004 inches of document travel. The video processor 6 performs three major functions; video block processing, character segmentation and character normalization. The video block processing tracks the print line and stores the video for that line. It computes the character pitch for each video line and transfers it to the character segmenter and normalizer 7. The character segmenter operats on the video data with the pitch information and separates that string of digital bits representing the video of each character scanned. The character normalizer operates on the video date with the information from the segmentation operation. The normalizer adjusts the height of the characters by deleting or combining horizontal rows of the video read. It reduces the width of the characters by deleting or combining vertical scans of the video. The resulting digital scan is then sent to the feature detector 8.

Character recognition is performed by using a measurement extraction process on the video data inputted to the feature detector 8, followed by a decision phase. The measurement extraction phase determines the significant identifying features of the character from the video shift register contents. Each measurement, (for example a lower left horizontal serif, an open top, and a middle bar) is stored as a bit in a specific location of a register with a maximum storage of 320 bits, and is called the measurement vector. The measurement vector is outputted from the feature detector 8 to the alphabetic feature comparator 10 and the numeric feature comparator 12. The feature comparator 10 compares the measurement vector for the character under examination with the measurement vector for alphabetical characters whose features are stored in the alphabetical feature storage 9. The alphabetical characters whose features most closely compare with the features of the character scanned, is outputted on the alphabetic character subfield line 16. Similarly, the feature comparator 12 compares the measurement vector outputted from the feature detector 8 for the character scanned, with numeric characters whose features are stored in the numeric feature storage 14. The features comparator 12 outputs on the numeric character subfield output line 18, the numeric character whose features most closely match the features of the character scanned. If a minimum threshold of feature matches is not met in the feature comparator of a given channel, a reject symbol is outputted on that respective OCR output line. A sample alphabetical character subfield 20 and corresponding numeric character subfield 22 which might be outputted from the dual output OCR, is shown in FIG. 2.

Figure 3:
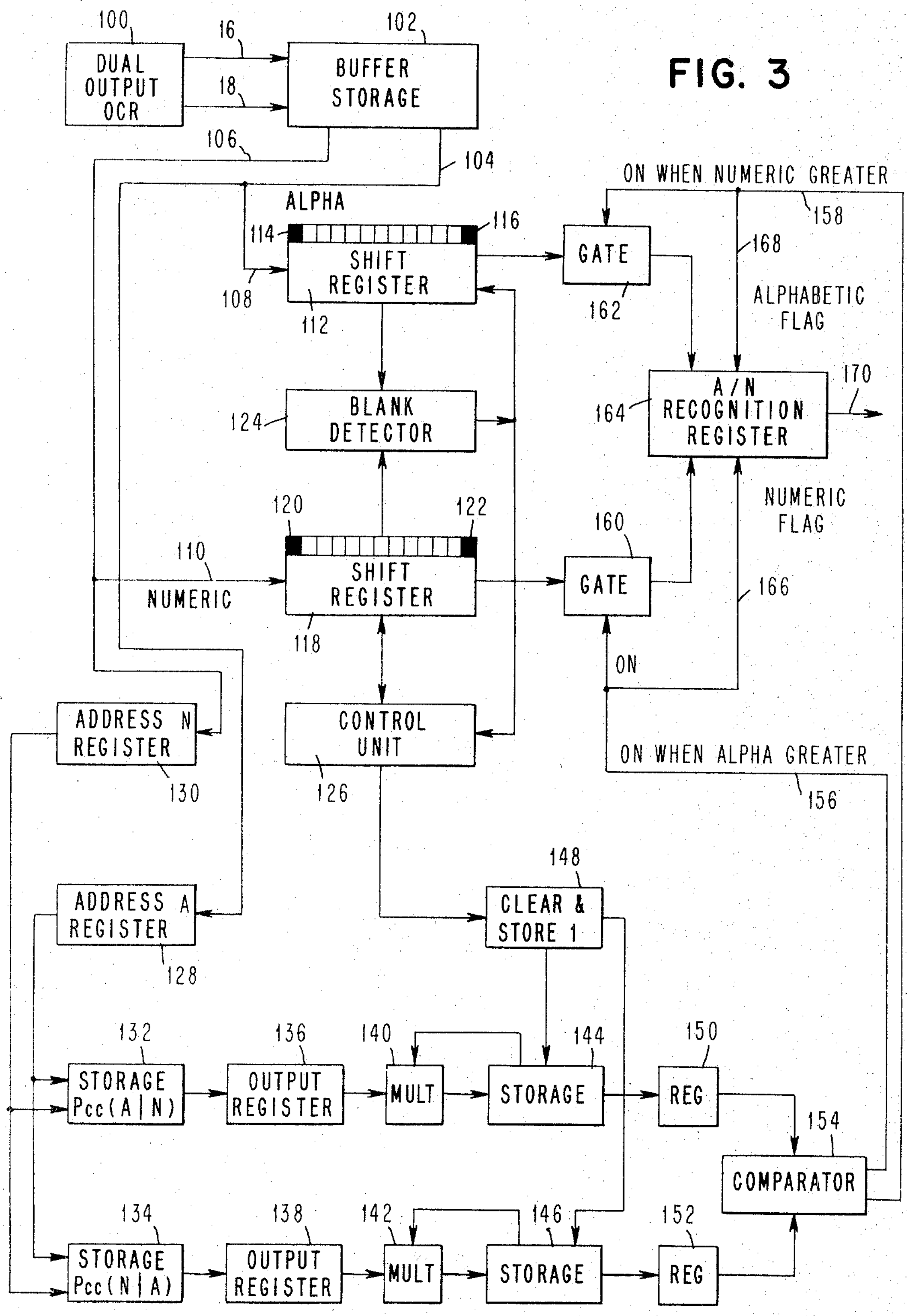
FIG. 3 depicts a detailed block diagram of the bayesian online numeric discriminator system.

The bayesian online numeric discriminator system is shown in FIG. 3. Dual output OCR of FIG. 2 is shown in FIG. 3 as the block 100. Line 16 is the alphabetic character subfield OCR output line and line 18 is the numeric character subfield OCR output line, each being connected to the buffer storage 102. From the buffer storage 102, the alphabetic character subfield is outputted on line 104 to the alphabetic shift register 112 and the storage address register 128. The numeric output from the buffer storage 102 is outputted on line 106 to the shift register 118 and the storage address register 130. At the input cell 114 for shift register 112 and the input cell 120 for the shift register 118, a line is connected to the blank detector 124 for testing for the presence of a blank or word separation character. On detection of a blank the decision process is activated by the control unit 126.

Upon detection of a blank at the input cell 114 or the input cell 120 of shift registers 112 or 118 respectively, the control unit 126 causes the alphabetic subfield character stream to be shifted into the shift register 112 a character at a time in synchronism with the numeric subfield characters which are shifted into the shift register 118 a character at a time. At the same time, each character in the alphabetic character subfield is sequentially loaded into the storage address register 128 and simultaneously each character in the numeric subfield character stream is loaded sequentially in the storage address register 130. The alphabetic character stored in the storage address register 128 and the numeric character stored in storage address register 130 embody, in combination, the storage address for alphabetic conditional probabilities P(a/n) in the storage 132 and numeric conditional probabilities P(a/n) in the storage 134.

The table of channel confusion statistics shown in Table I containing the conditional probability P(a/n), that an alphabetic character was output by the OCR given that a numeric character was actually scanned, is stored in the storage 132. With reference to Table I, the probability values stored in the storage 132 are accessed by the numeric character assumed to have been scanned and the alphabetic character read, being the contents, respectively, of the storage address register 130 and the storage address register 128. The channel confusion statistics of Table II relating to the conditional probability that a numeric character was read by the OCR given that an alphabetic character was scanned, is stored in the storage 134. With reference to Table II, the values of the conditional probability P(n/a) stored in the storage 134 are accessed by the numeric character read and the alphabetic character assumed to have been scanned, which reside respectively in the storage address register 130 and the storage address register 128. For each input character an alphabetic conditional probability P(a/n) and a numeric conditional probability P(n/a) are proved to the storage output registers 136 and 138, respectively.

The conditional probability values P(a/n) sequentially stored in the storage output register 136, are sequentially multiplied by the multiplier 140, times the sequentially updated contents of the storage register 144. The multiplication process continues in chain fashion until the product of all the alphabetic conditional probabilities has been calculated for the alphabetic character subfield stored in the shift register 112, the end of which is detected by testing for the terminating blank at the input cell position 114 of the shift register 112. In similar fashion for the numeric subfield, the product of the numeric conditional probabilities P(n/a) is sequentially calculated by the multiplier 142 and stored in the storage 146, the end of the numeric subfield being detected at the input cell location 120 of the shift register 118. The product of the alphabetic conditional probabilities stored in storage 144 is transferred to the register 150 and the product of the numeric conditional probabilities stored in the storage 46 is transferred to the register 152 and the contents of the registers 150 and 152 respectively are compared for relative magnitude in the comparator 154.

The comparator 154 determines whether the product of the numeric conditional probabilites is greater than the product of the alphabetic conditional probabilities. In the event the alphabetic conditional probability is higher, this indicates that the respective numeric characters on numeric line 18 are more compatible with the assumption that the alphabetic character on alpha line 16 were scanned and aliased as numeric characters than the converse, that the respective alphabetic characters are more compatible with the assumption that the numeric characters were scanned and aliased as alphabetic characters. Since it is more probable that the word scanned is the numeric subfield stored in the shift register 118, the comparator 154 activates the gate 160 causing the shift register 118 to output the numeric subfield to the alphanumeric recognition register 164, making the numeric subfield available for output on output line 170 for further post processing, if desired. A numeric flag may also be introduced into the alpha numeric output stream on line 170 by the line 166.

Conversely, if the product of the numeric conditional probability stored in the register 152 is greater than the product of the alphabetic conditional probabilities stored in register 150, the comparator 154 activates the gate 162 causing the alphabetic character subfield stored in the shift register 112 to be outputted to the alpha numeric recognition register 164 for output on the output line 170, for further post processing, if desired. An alphabetic flag may be introduced in the output stream on line 170, by line 168, if desired.

Operation of the Bayesian Online Numeric Discriminator

The Operation of BOND is illustrated in FIG. 4 and in Table IV, for a mail processing application. FIG. 4 is a copy of the BOND output of an actual mail piece read by the OCR. The address scanned was: Aaron Bakers, 5150 Page Bl., Saint Louis, MO. The alphabetic and numeric subfields on the OCR output lines are shown. The presence of two more reject symbols in the numeric subfield of line 1, than occur in the alphabetic subfield, invokes the reject symbol criterion, described above. Line 2 requires the application of BOND. Lind 3 uses both the reject symbol criterion and BOND. The step by step calculations related to fields 1 and 2 of line 2 is shown in Table IV. The concerted use of the bayesian online numeric discriminant technique disclosed herein has been proven in test bed simulations to be highly effective. Using raw mail piece input data from the OCR, a correct alpha numeric discrimination rate of 99 percent has been achieved. The bayesian online numeric discriminator has a similar efficacy in general text processing applications. (INSERT IV)

Figure 5:
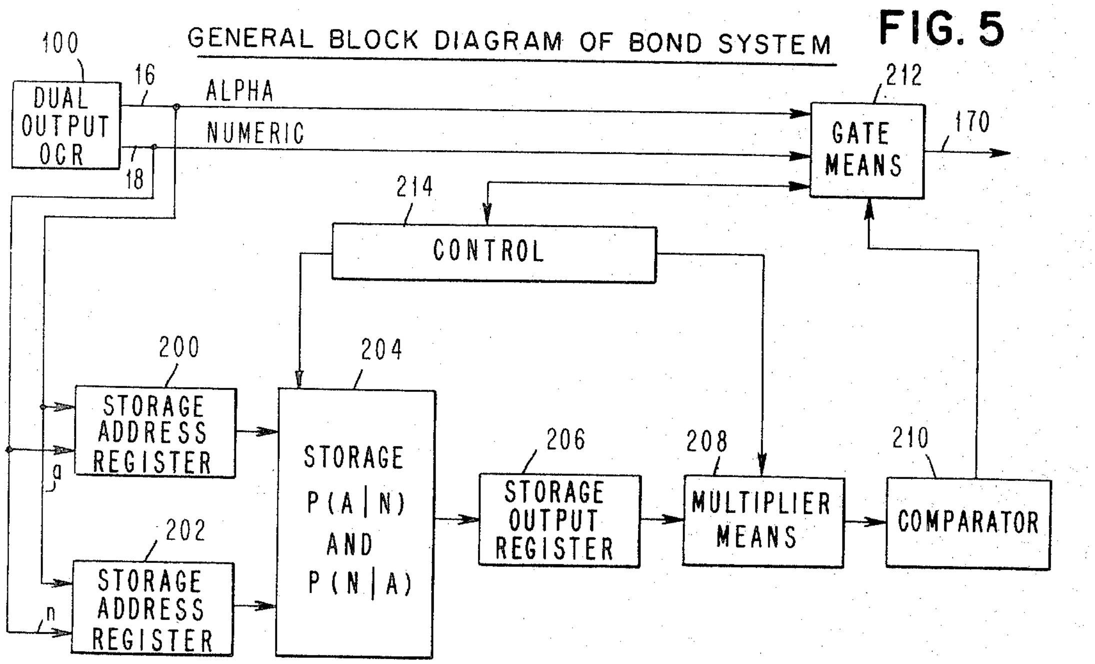
FIG. 5 is a general block diagram of the system.

It should be recognized that the detailed block diagram of the BOND system shown in FIG. 3 can be modified without departing from the spirit and scope of the invention disclosed and claimed. For example, a general block diagram of the BOND system is shown in FIG. 5. The dual output optical character reader 100 has its alphabetic subfield output line 16 connected to the alpha storage register 200 and the OCR numeric subfield output line 18 connected to the numeric storage address register 202. The storage address register 200 and 202 operate as storage buffers for the respective alpha and numeric recognition stream and, under the control of control 214, sequentially output single alphabetic and numeric character pairs to the storage 204. The storage 204 contains both the first type of conditional probability that the alphabetic character outputted from the alphabetic storage address register 200 was read given that the numeric character outputted from the numeric storage address register 202 was scanned and the second type conditional probability that the numeric character outputted from the numeric storage address register 202 was read given that the alphabetic character outputted from the alphabetic storage address register 200 was scanned. These first and second types of conditional probabilities are outputted from the storage 204 to the storage output register 206. The first and second types of conditional probabilities are then outputted to the multiplier means 208 which, under the control of control 214 calculates a first product of all the first type of conditional probabilities and a second product of all the second type of conditional probabilities for the character field scanned by the dual output OCR 100. Meanwhile, the gate means 212 serves as a buffer storage for both the alphabetic character subfield outputted on line 16 and the numeric character subfield outputted on line 18 from the OCR. The gating means 212 signals the control 214 as to the position of characters and blanks in the alphabetic and numeric subfields. The multiplier means 208 under the control of control 214, outputs the first and second products to the comparator 210 which can store and compare the relative magnitudes thereof. Output from the comparator 210 indicates whether it is more probable that the alphabetic character subfield was scanned or that it is more probable that the numeric subfield was scanned and transmits that indication to the gating means which in turn, outputs on the system output line 170, the appropriate alphabetic subfield or numeric subfield. Many of the hardware elements shown in the general block diagram of FIG. 5 can be supplied from the prior art wihtout the exercise of further invention.

While the invention has been particularly shown and described with reference to the preferred embodiments thereof, it will be understood by those skilled in the art that the foregoing and other changes in form and details may be made therein without departing from the spirit and scope of the invention.

We claim:

1. An apparatus for discriminating the alphabetic or numeric character of a character field scanned by an optical character recognition machine, comprising:

an optical character recognition machine adapted to sequentially scan the characters in a character field, analyze the features of each character scanned, compare the features of each character scanned with a first matrix of stored features of alphabetic characters, output on a first output line the alphabetic character whose stored features most nearly match the features of each character scanned, for all characters scanned, compare the features of each character scanned with a second matrix of stored features of numeric characters and output on a second output line in synchronism with said output on said first line, a numeric character whose stored features most nearly match the features of the character scanned, for each character scanned;

a first shift register connected to said first OCR output line, for sequentially loading and storing the alphabetic field which is the OCR alphabetic interpretation of the scanned character field, outputted on said first line;

a second shift register connected to said second OCR output line, for sequentially loading and storing the numeric field which is the OCR numeric interpretation of the scanned character field, outputted on said second line;

a first storage address register connected to said first OCR output line for sequentially storing each alphabetic character in the alphabetic field outputted on said first OCR output line;

a second storage address register connected to said second OCR output line for sequentially storing each numeric character in the numeric field outputted on said second OCR output line;

a first storage means connected to said first and second storage address registers, having stored therein the conditional probabilities that a certain alphabetic character was inferred by the OCR given that a certain numeric character was scanned, for all combinations of alphabetic characters with numeric characters, said first storage means being accessed by the contents of said first and second storage address registers to yield the conditional probability that the numeric character stored in the second storage address register was misread by the OCR as the alphabetic character stored in the first storage address register;

a second storage means connected to said first and second storage address registers, having stored therein the conditional probabilities that a certain numeric character was inferred by the OCR given that a certain alphabetic character was scanned, for all combinations of alphabetic characters with numeric characters, said second storage means being accessed by the contents of said first and second storage address registers to yield the conditional probability that the alphabetic character stored in the first storage address register was misread by the OCR as the numeric character stored in the second storage address register;

a first storage output register connected to said first storage means for sequentially storing each conditional probability value accessed from said first storage means by said first storage address register;

a second storage output register connected to said second storage means for sequentially storing each conditional probability value accessed from said second storage means by said second storage address register;

a first multiplier means connected to said first storage output register for calculating the product of all the conditional probabilities accessed from said first storage means, said product being a first total conditional probability that all numeric characters stored in the second shift register were misread by the OCR as the alphabetic characters stored in said first shift register;

a second multiplier means connected to said second storage output register for calculating the product of all the conditional probabilities accessed from said second storage means, said product being a second total conditional probability that all the alphabetic characters stored in the first shift register were misread by the OCR as the numeric characters stored in said second shift register;

a comparator connected to said first and second multiplier means for comparing the magnitudes of said first and second total conditional probabilities and outputting an indication that a scanned character field is alphabetic if said second total conditional probability, is greater than said first total conditional probability, or is numeric if said first total conditional probability is greater than said second total conditional probability.

2. The apparatus claimed in claim 1, which further comprises:

a first gate having a data input connected to the output of said first shift register and having a control input connected to the output of said comparator, and an output connected to a system output line, for transmitting the alphabetic field which is the OCR alphabetic interpretation of the scanned character fields to said system output line, when said comparator outputs to said first gate control input an indication that the scanned character field is alphabetic;

a second gate having a data input connected to the output of said second shift register, a control input connected to the output of said comparator, and an output connected to said system output line, for transmitting the numeric field which is the OCR numeric interpretation of the scanned character field from said second shift register to said system output line when said comparator outputs on said second gate control input an indication that the scanned character field is numeric.

* * * * *